US012702614B2

(12) United States Patent
Gormley

(10) Patent No.: US 12,702,614 B2
(45) Date of Patent: Aug. 11, 2026

(54) LIGHT SOURCE FOR EMISSION OF PROJECTIONS INDICATING IDEAL FOOT PLACEMENT AND ORIENTATION RELATIVE TO A WALKING AID

(71) Applicant: John M. Gormley, Louisville, KY (US)

(72) Inventor: John M. Gormley, Louisville, KY (US)

( * ) Notice: Subject to any disclaimer, the term of this patent is extended or adjusted under 35 U.S.C. 154(b) by 271 days.

(21) Appl. No.: 18/666,619

(22) Filed: May 16, 2024

(65) Prior Publication Data

US 2025/0352423 A1 Nov. 20, 2025

(51) Int. Cl.

| | |
|---|---|
| ***A61H 3/04*** | (2006.01) |
| ***F21L 4/02*** | (2006.01) |
| ***F21V 5/00*** | (2018.01) |
| ***F21V 11/14*** | (2006.01) |
| ***F21V 14/08*** | (2006.01) |
| ***F21V 33/00*** | (2006.01) |
| *F21W 111/023* | (2006.01) |
| *F21Y 115/10* | (2016.01) |

(52) U.S. Cl.

CPC .................. *A61H 3/04* (2013.01); *F21L 4/02* (2013.01); *F21V 5/007* (2013.01); *F21V 11/14* (2013.01); *F21V 14/085* (2013.01); *F21V 33/0068* (2013.01); *A61H 2201/0188* (2013.01); *A61H 2201/5048* (2013.01); *F21W 2111/023* (2013.01); *F21Y 2115/10* (2016.08)

(58) Field of Classification Search

CPC .............. A61H 3/04; A61H 2201/0188; A61H 2201/5048; F21L 4/02; F21L 4/027; F21V 5/007; F21V 11/14; F21V 14/085; F21V 33/0068

See application file for complete search history.

(56) References Cited

U.S. PATENT DOCUMENTS

| | | | |
|---|---|---|---|
| 5,575,294 | A | 11/1996 | Perry et al. |
| 7,484,740 | B2 | 2/2009 | Miller |
| 8,702,567 | B2 | 4/2014 | Hu et al. |

(Continued)

FOREIGN PATENT DOCUMENTS

| | | |
|---|---|---|
| CN | 105342812 | 2/2016 |
| CN | 205728299 | 11/2016 |

(Continued)

OTHER PUBLICATIONS

"Freezing of gait" YouTube, uploaded by The Lancet. Retrieved from https://www.youtube.com/watch?v=3-wrNhyVTNE. Dated May 24, 2015.

(Continued)

*Primary Examiner* — John D Walters
(74) *Attorney, Agent, or Firm* — Gray Ice Higdon

(57) ABSTRACT

A walking aid that projects visual indications corresponding to repositioning of the walking aid. At least one indication for each foot is projected simultaneously. Each indication has dimensions corresponding to a circle or oval. The spacing between each indication can be modified to achieve different step length patterns. Each indication is projected at separate positions on a surface beneath the walking aid. Each position of the separate positions remains relatively static while the walking aid is both stationary and being displaced.

20 Claims, 14 Drawing Sheets

(56) References Cited

U.S. PATENT DOCUMENTS

| | | | | |
|---|---|---|---|---|
| 8,961,186 | B2 | 2/2015 | LoSasso | |
| 9,125,790 | B2 * | 9/2015 | Van Gerpen | A61H 3/04 |
| 9,241,864 | B2 | 1/2016 | Miller | |
| 9,675,515 | B2 | 6/2017 | Chou et al. | |
| 9,801,437 | B2 | 10/2017 | Ho | |
| 10,242,590 | B2 * | 3/2019 | Yu | A61B 5/7445 |
| 10,588,814 | B1 | 3/2020 | Engel et al. | |
| 11,432,987 | B2 | 9/2022 | Sala et al. | |
| 11,790,804 | B2 | 10/2023 | Collin et al. | |
| 2006/0292533 | A1 | 12/2006 | Selod | |
| 2007/0034243 | A1 | 2/2007 | Miller | |
| 2007/0255186 | A1 | 11/2007 | Grill | |
| 2010/0100013 | A1 | 4/2010 | Hu et al. | |
| 2013/0014790 | A1 | 1/2013 | Van Gerpen | |
| 2013/0167888 | A1 | 7/2013 | Losasso | |
| 2013/0171598 | A1 | 7/2013 | LoSasso | |
| 2014/0319792 | A1 | 10/2014 | Miller | |
| 2016/0310341 | A1 | 10/2016 | Yu | |

FOREIGN PATENT DOCUMENTS

| | | | |
|---|---|---|---|
| CN | 211132874 | 7/2020 | |
| CN | 211486492 | 9/2020 | |
| CN | 211658683 | 10/2020 | |
| CN | 219049332 | 5/2023 | |
| DE | 102014215487 | 2/2016 | |
| DE | 202020107585 | 2/2021 | |
| KR | 101800557 | 11/2017 | |
| WO | WO-2016081994 A1 * | 6/2016 | A61B 5/1117 |
| WO | WO-2020256550 A1 * | 12/2020 | A61B 5/112 |
| WO | 2021158668 | 8/2021 | |

OTHER PUBLICATIONS

“The U-Step 2 Walker, a Parkingson’s Therapy Aid” YouTube, uploaded by UstepWalker. Retrieved from https://www.youtube.com/watch?v=mirtZhHJSB4. Dated May 8, 2023.

“Parkinson’s patient visual cueing gait training unweighing at LMU Munich” YouTube, uploaded by hpcosmos. Retrieved from https://www.youtube.com/watch?v=JMj8YFC4qt8. Dated Jan. 26, 2012.

“Standard U-Step Neuro—UStep” Retrieved from https://www.ustep.com/standard-u-step-2/.

“LaserCue—UStep” Retrieved from https://www.ustep.com/lasercue/.

* cited by examiner

LIGHT SOURCE FOR EMISSION OF PROJECTIONS INDICATING IDEAL FOOT PLACEMENT AND ORIENTATION RELATIVE TO A WALKING AID

TECHNICAL FIELD

Embodiments herein relate to walking aids, specifically rollators having one or more wheels.

BACKGROUND

Parkinson's disease is a neurodegenerative disease that may be accompanied by symptoms of irregular gait patterns, such that patients with symptoms of Parkinson's may use a rollator to assist while walking.

Traditionally, patients may use simple walking aids, e.g., simple canes, rollators, wheelchairs, etc.

Accordingly, it would be desirable to have a walking aid capable of providing, e.g., indications that correlate to rollator movement and which correspond to each foot. It would be further desirable if the indications correspond to dimensions of a foot, as opposed to being a mere straight line. It would also be desirable if indications would remain relatively static at a same point of a surface beneath a rollator both prior to and subsequent to movement of the rollator.

SUMMARY OF THE INVENTION

It is therefore a feature of the present invention to provide a projector which may be affixed to a walking aid (e.g., a rollator), that projects visual indications corresponding to repositioning of the walking aid, wherein at least one indication for each foot is projected simultaneously, each indication having dimensions corresponding to a foot, and each indication being projected at separate positions on a surface beneath the walking aid, wherein each position of the indications remain relatively static while the walking aid is both stationary and being displaced.

Accordingly, embodiments herein relate to rollators equipped with a projector capable of providing a plurality of shaped projections on a surface beneath the rollator, the projector simultaneously projecting a first projection at a first location indicative of ideal placement of a first foot of a user and a second projection at a second location indicative of ideal placement of a second foot of the user, wherein the projector further simultaneously projects projections corresponding to both current and future ideal placements for a foot, and wherein the projections correspond to dimensions of a foot.

The present invention includes a rollator comprising a frame connected to a plurality of wheels. A projector housing may be mounted to the frame, the projector housing including one or more apertures facing a plane over which the plurality of wheels are in contact. A projector may be located in the projector housing. A first bank of light emitting diodes (LEDs) can be spaced along a first circumferential portion of the projector and a second bank of LEDs can be spaced along a second circumferential portion of the projector. In various implementations, banks of lights may be equidistantly spaced apart. In various implementations, banks of lights may not be spaced apart equidistantly. The first and second circumferential portions may be spaced apart. The first and second bank of LEDs may be positioned in staggered pairs on the projector. The first bank of LEDs may be offset from the second bank of LEDs. A power supply may power the first bank of LEDs and the second bank of LEDs. The projector may rotate proportionally to at least one wheel of the plurality of wheels.

The first bank of LEDs and second bank of LEDs may be configured to project projections of different parameters, e.g., shapes, sizes, colors, patterns, intensities, brightnesses, distances, placements, etc., to further distinguish respective locations for ideal placement for each foot of a user. The first bank of LEDs may be configured to project light at least in front of, below, and/or behind a first side of the rollator, and the second bank of LEDs may be configured to project light at least forward, below, and/or behind a second side of the rollator. The first bank of LEDs and second bank of LEDs may emit projections in a circular shape or in the annular shape of a foot (e.g., an oval shape). The aperture of the projector housing may be one or more of forward facing, downward facing, and rearward facing. The first and second bank of LEDs may have corresponding focalized lenses. The focalized lenses may impact one or more parameters of projections, e.g., shapes, sizes, etc.

The proportional rotation of the projector of the projector may be caused by a connection between the projector and a wheel. The connection may be a mechanical connection, such as a belt and pulley system, in which rotation of the wheel results in displacement of a belt connected to a shaft connected to the projector, wherein displacement of the belt results in corresponding rotational displacement of the projector via transfer of force between the aforementioned components. In various implementations, the connection between the projector and wheel may be an electronic connection in which one or more sensors are configured to identify displacement of the wheel and to send a signal to a motor connected to the projector, wherein the signal causes the motor to rotate the projector proportional to the displacement of the wheel. Circuitry (e.g., including computers) may provide electrical connections and facilitate electrical signals between components discussed herein and may impact operation thereof. For example, circuitry may impact operation of the projector, including whether projections are projected, and what parameters projections may exhibit.

Many benefits are associated with the invention disclosed herein. For example, projections indicative of ideal placement for each foot of a user provide cueing as to which foot should be moved. Projections indicating at least two or more of a future, current, and past ideal foot placement for each foot may facilitate user initiation as to how far a foot should move and/or timing of each foot movement. Projections having distinct parameters corresponding to each separate foot projection promote cueing and swift comprehension of upcoming gait movements, e.g., which foot to move, how far to move it, when to move it, etc.

In various implementations a rollator may include a frame having a plurality of wheels, a light projector housing mounted to the frame, a light projector located inside the light projector housing, a first bank of LEDs spaced along a first circumferential portion of the light projector and a second bank of LEDs spaced along a second circumferential portion of the light projector, and a power supply electrically connected to the first bank of LEDs and to the second bank of LEDs. In various implementations, the light projector housing may include one or more housing apertures facing at least a plane over which the plurality of wheels are in contact. In various implementations, the light projector rotates proportional to at least one wheel of the plurality of wheels. In various implementations, LEDs of the first bank of LEDs and the second bank of LEDs may be staggered and/or offset.

In various implementations, the first bank of LEDs and the second bank of LEDs are electrically connected to at least one driver, and the first bank of LEDs and the second bank of LEDs are of different colors. In various implementations, the first bank of LEDs project light projections adjacent to a first side of the rollator frame and the second bank of LEDs project light projections adjacent to a second side of the rollator frame that is opposite the first side of the rollator frame. In various implementations, the light projections of the first bank of LEDs and the second bank of LEDs are circular or oval shaped. In various implementations, one or more lenses are secured adjacent to each LED of the first bank of LEDs and the second bank of LEDs, and the light projections of the first bank of LEDs and the second bank of LEDs are circular or oval shaped based on the light projections of the first bank of LEDs and the second bank of LEDs passing through the one or more lenses.

In various implementations, the light projections of the first bank of LEDs are projected along a first axis that is parallel to an orientation of the plurality of wheels and the light projections of the second bank of LEDs are projected along a second axis that is parallel with the orientation of the plurality of wheels. In various implementations, the light projections adjacent to the first side of the rollator frame are staggered apart by a distance that is selectable by a user. In various implementations, the light projections adjacent to the first side of the rollator frame and the light projections adjacent to the second side of the rollator frame are offset by a distance that is selectable by a user. In various implementations, at least one or more housing apertures of the light projector housing face at least a plane over which the plurality of wheels are in contact. In various implementations, each of the LEDs of the first bank of LEDs and of the second bank of LEDs have a focalized lens. In various implementations, the focalized lens for each of the LEDs causes light projections of the first bank of LEDs and the second bank of LEDs to be circular or oval shaped.

In various implementations, rotation of the light projector is caused by a connection between the light projector and at least one wheel. In various implementations, the connection is a mechanical belt and a pulley system, including a pulley drum attached to a shaft that is attached to the light projector, a pulley that is attached to the at least one wheel, and a belt connecting the pulley drum and the pulley. In various implementations, the connection is an electronic connection including one or more sensors configured to identify displacement of the at least one wheel and configured to send a signal to a motor connected to the light projector, and the signal causes the motor to rotate the light projector proportional to the displacement of the at least one wheel. In various implementations, the light projector is cylindrically shaped. In various implementations, the first and second bank of LEDs project light projections are maintained at fixed positions on a surface beneath the rollator while the rollator is displaced over the surface.

In various implementations, a rollator may include a frame having a plurality of wheels and a light projector housing, mounted to the frame, that houses a rotating light projector. In various implementations, the light projector includes a first bank of LEDs including a first plurality of staggered LEDs, and a second bank of LEDs including a second plurality of staggered LEDs. In various implementations, the first bank of LEDs and the second bank of LEDs are offset and positioned on separate circumferential portions of the light projector. In various implementations, the first bank of LEDs project light adjacent to a first side of the frame and the second bank of LEDs project light adjacent to a second side of the frame. In various implementations, the rotating light projector rotates proportionally to rotation of at least one wheel of the plurality of wheels.

In various implementations, the first bank of LEDs and the second bank of LEDs project light projections that are circular or oval shaped, and that are projected onto a surface beneath the plurality of wheels. In various implementations, a focalized lens is secured over each of the LEDs. In various implementations, the first bank of LEDs is a first color and the second bank of LEDs is a second color. In various implementations, the light projections are maintained at fixed positions on the surface while the rollator is displaced over the surface.

In various implementations, a rollator may include a frame having a plurality of wheels, and a light projector housing mounted to the frame. In various implementations, the light projector housing includes one or more housing apertures facing at least a plane over which the plurality of wheels are in contact. In various implementations, a light projector may be located inside the light projector housing. In various implementations, the light projector rotates proportionally to a wheel of the plurality of wheels. In various implementations, a first bank of lights may be equidistantly spaced along a first circumferential axis of the light projector and a second bank of lights may be equidistantly spaced along a second circumferential axis of the light projector. In various implementations, the first circumferential axis and the second circumferential axis are spaced apart and parallel. In various implementations, a longitudinal light projector axis, that is perpendicular to, and passes through, the first circumferential axis and the second circumferential axis, may pass through only one of a light of the first bank of lights or a light of the second bank lights based on a rotational position of the light projector. In various implementations, the first bank of lights is configured to project one or more first projections along a first axis of the plane, and the second bank of lights is configured to project one or more second projections onto a second axis the plane. In various implementations, the first axis and second axis of the plane being parallel and separated by a width that is proportional to spacing between the first and second circumferential axis. In various implementations, a widthwise axis, that is perpendicular to, and passes through, the first axis of the plane and the second axis of the plane, passes through only one of a first projection of the one or more first projections or a second projection of the one or more second projections, based on the rotational position of the light projector. In various implementations, the first projection and the second projection are projected simultaneously.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DRAWINGS

DETAILED DESCRIPTION

Figure 1:
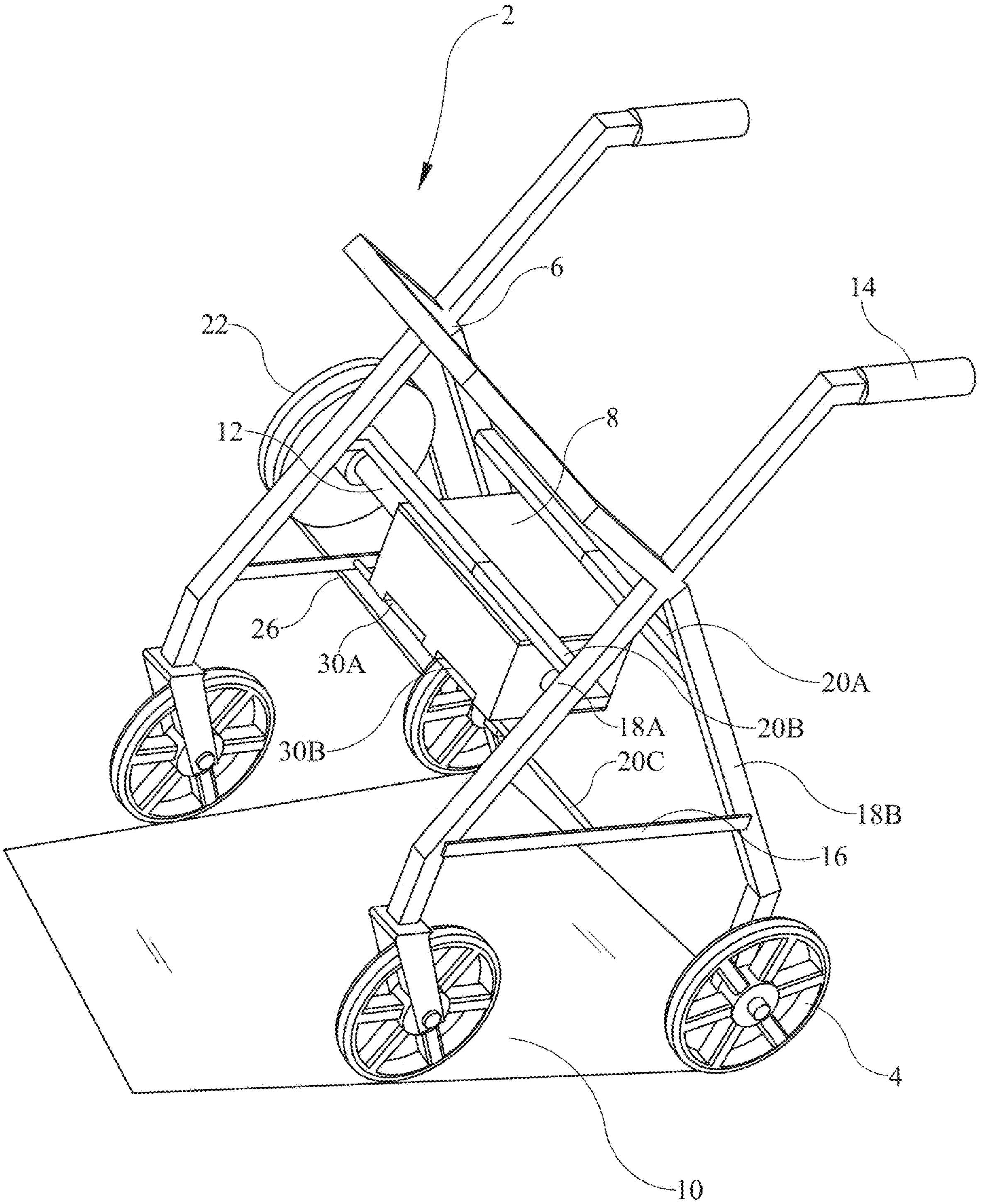
FIG. 1 is a frontal downward perspective view of a rollator with a projector.

FIG. 1 depicts a frontal downward perspective view of a rollator 2 with a projector. Rollator 2 may comprise a frame 6 attached to one or more wheels 4 and handles 14. Pulley drum 22 may be secured adjacent to frame 6. A shaft 12 may extend from pulley drum 22 to projector housing 8. As discussed previously, shaft 12 may be connected with a projector located inside the projector housing 8, such that rotation of shaft 12 results in rotation of the projector. As depicted in FIG. 1, in various implementations projector housing 8 may be centrally located within the rollator frame 6. Wheels 4 may be in contact with a plane 10 located beneath them.

Frame 6 may be comprised of a plurality of abscissa, ordinate, and applicate segments. For example, each opposite side of frame 6 may include two ordinate segments 18A and 18B and at least one abscissa segment 16. Each side of frame 6 may be connected by a plurality of applicate segments, such as applicate segments 20A-20C. In various implementations, projector housing 8 may be supported by and/or secured to one or more applicate segments. Frame 6 and segments included therein, as depicted in FIG. 1, are only examples of many possible configurations capable of implementing features herein. Accordingly, placement and orientation of components disclosed herein are only for example purposes, and modification of placement and/or orientation, and addition, reduction, and/or modification of components disclosed herein are possible while remaining consistent with the disclosure herein.

For example, in various implementations, one or more wheels 4 may be substituted with posts, such that tilting rollator 2 at an angle and applying force in a direction will cause remaining wheels 4 to move in the direction, and removing the tilt will cause posts to contact plane 10 for stability of rollator 2. As another example, projector housing 8 may be positioned off-center relative to frame 6. Projector housing 8 may be raised or lowered, and/or shifted from side to side. Pulley drum 22 and shaft 12 may be configured to engage with projector housing 8 from either side as well.

Projector housing 8 may house one or more components configured to cause and/or facilitate emission of one or more projections towards plane 10 beneath rollator 2. Projections may be projected through one or more apertures of projector housing 8. For example, FIG. 1 depicts projector housing 8 as including 2 apertures 30A and 30B, through which projections may be projected onto plane 10, which apertures 30A and 30B may face.

Figure 2:
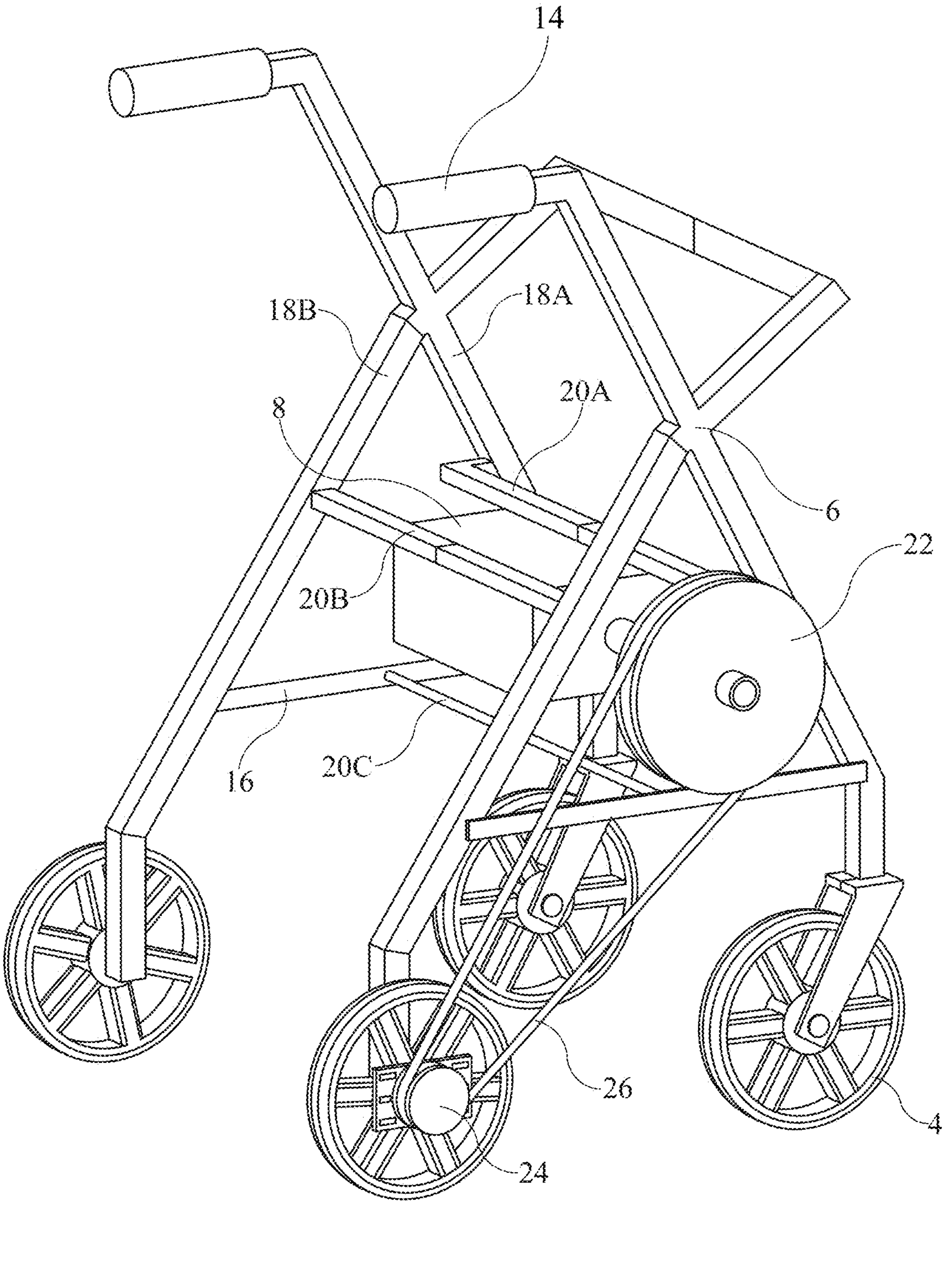
FIG. 2 is a rear downward perspective view of a rollator with a projector.

FIG. 2 depicts a rear downward perspective view of rollator 2. Belt 26 connects pulley drum 22 and wheel pulley 24. Rotation of wheel 4 connected to wheel pulley 24 may result in displacement of belt 26, which may in turn result in rotation of pulley drum 22, e.g., resulting in a belt and pulley system. Accordingly, clockwise rotation of a wheel 4 may result in clockwise rotation of a projector, and counterclockwise rotation of a wheel 4 may result in counterclockwise rotation of a projector. Thus, a projector may emit projections in a "forward" or "reverse" manner based on rotational movement of wheels 4.

Figure 3:
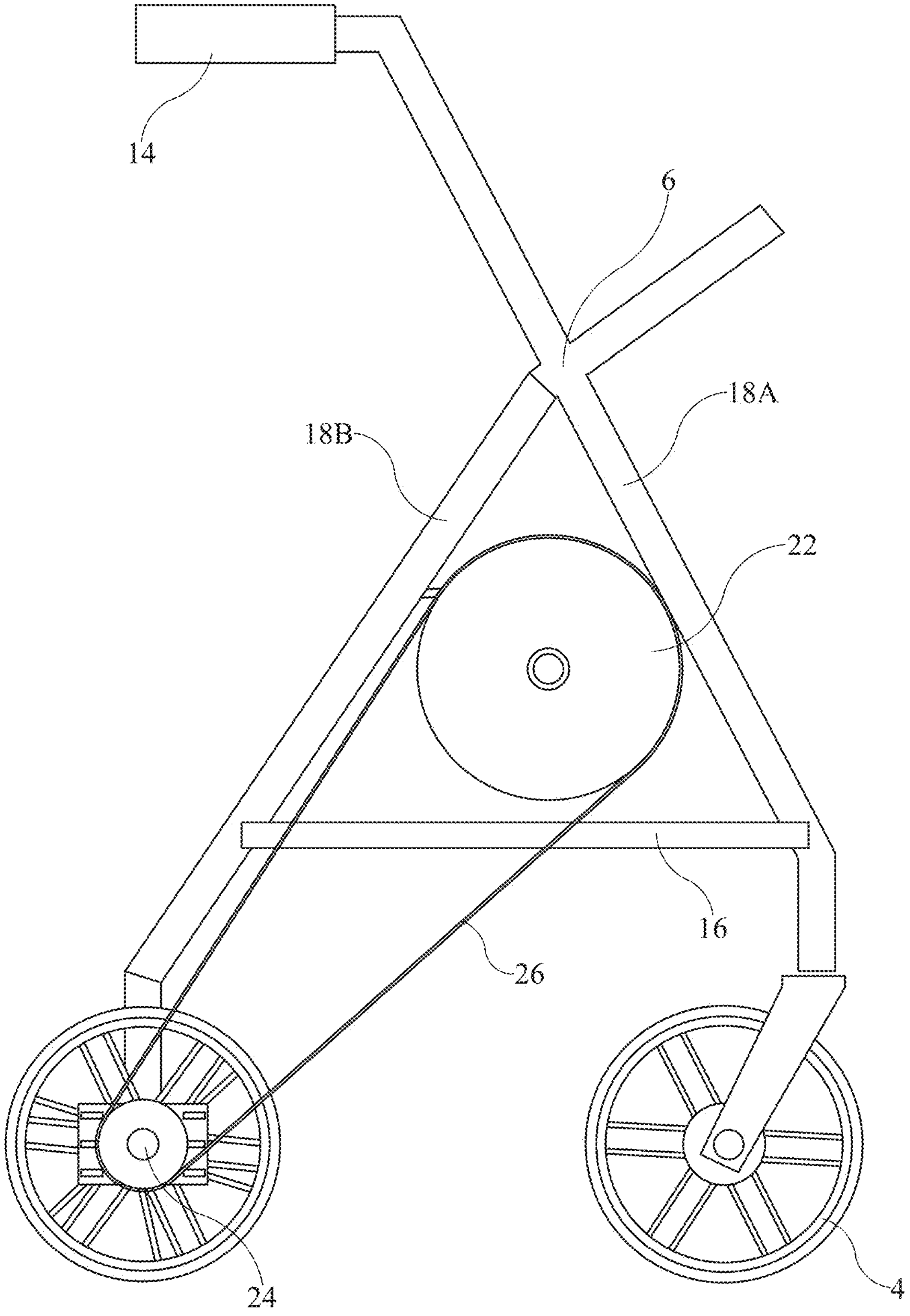
FIG. 3 is a side view of a rollator with a projector.
Figure 4:
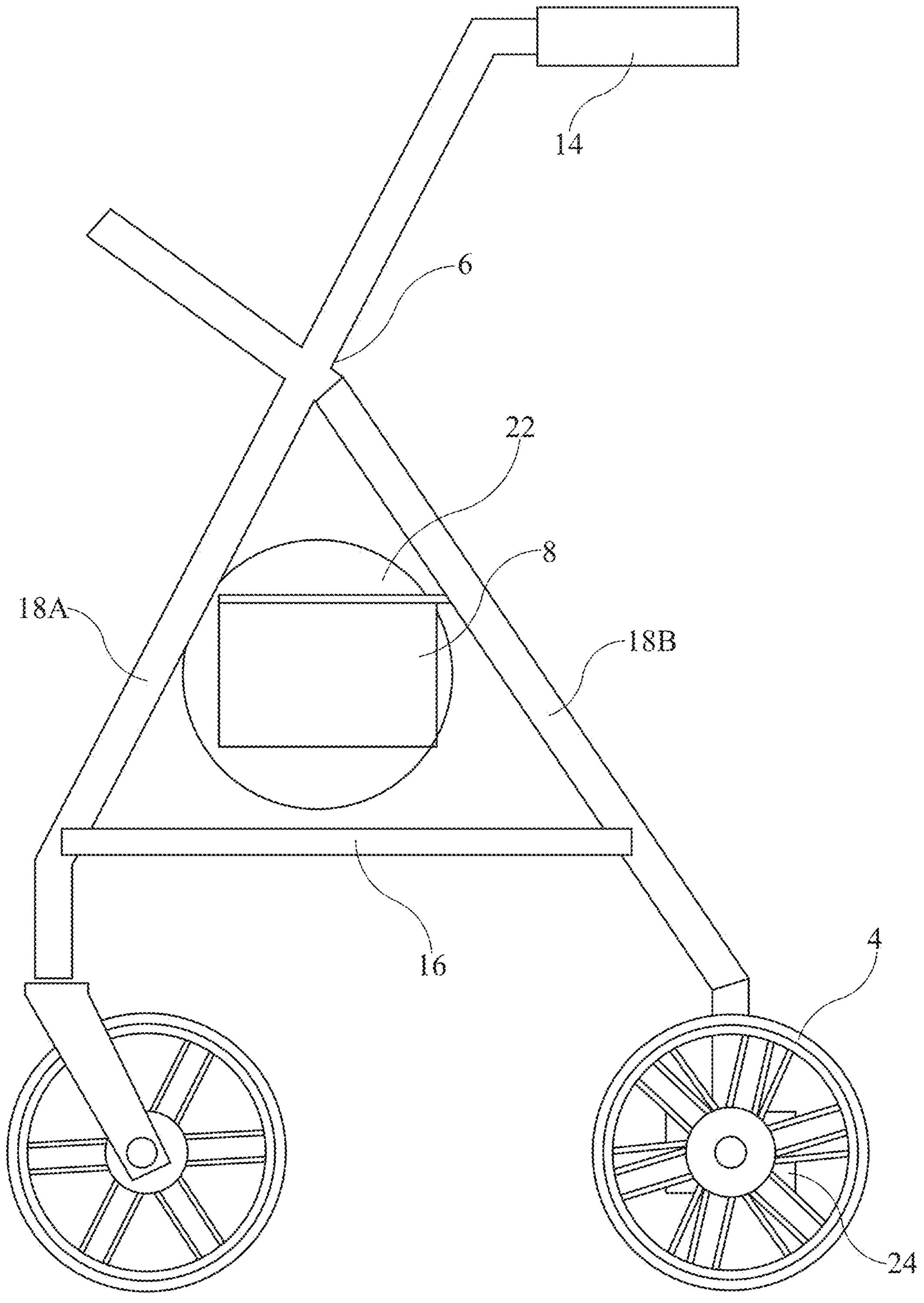
FIG. 4 is a partial cut-away opposing side view of a rollator with a projector.
Figure 5:
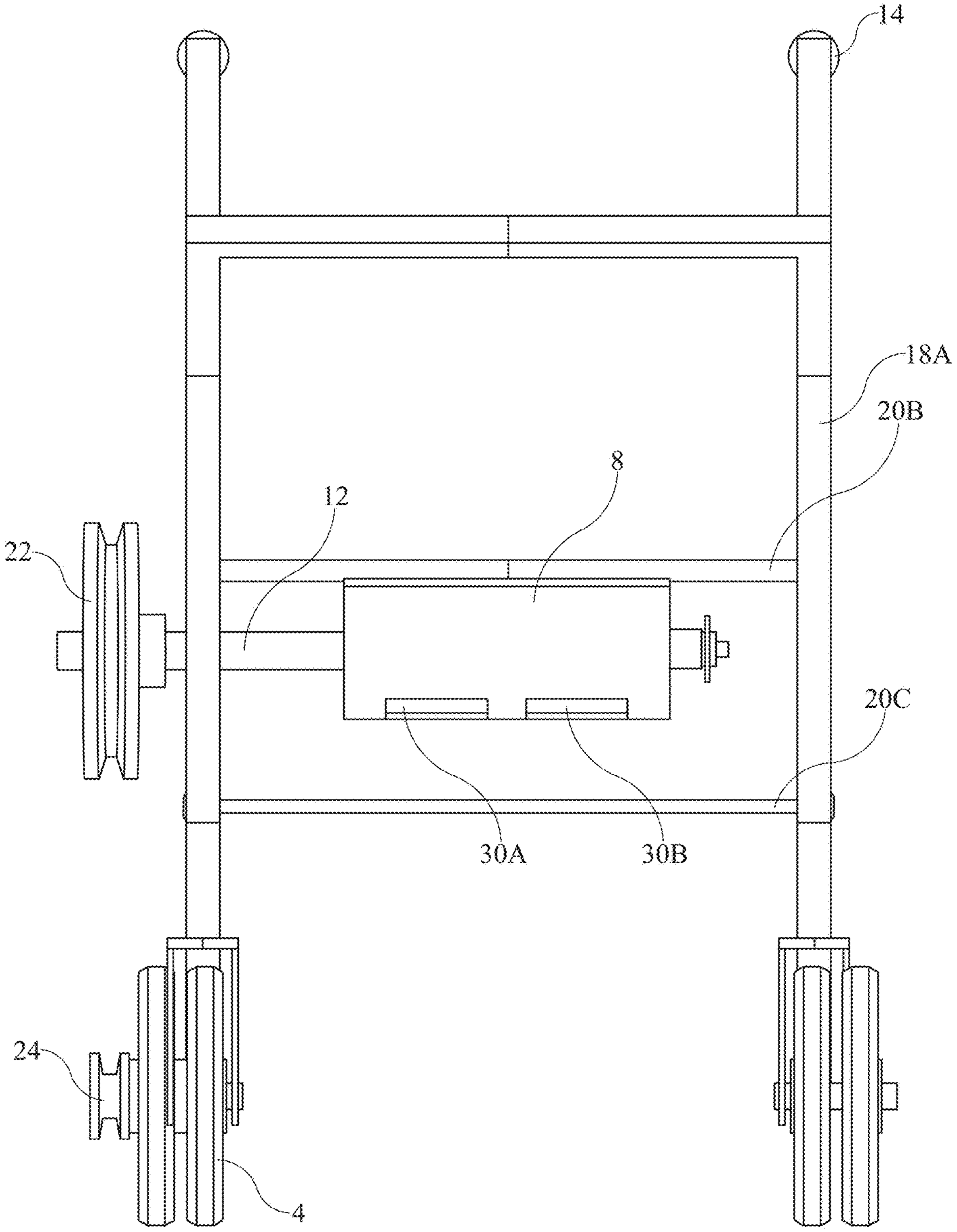
FIG. 5 is a front view of a rollator with a projector.
Figure 6:
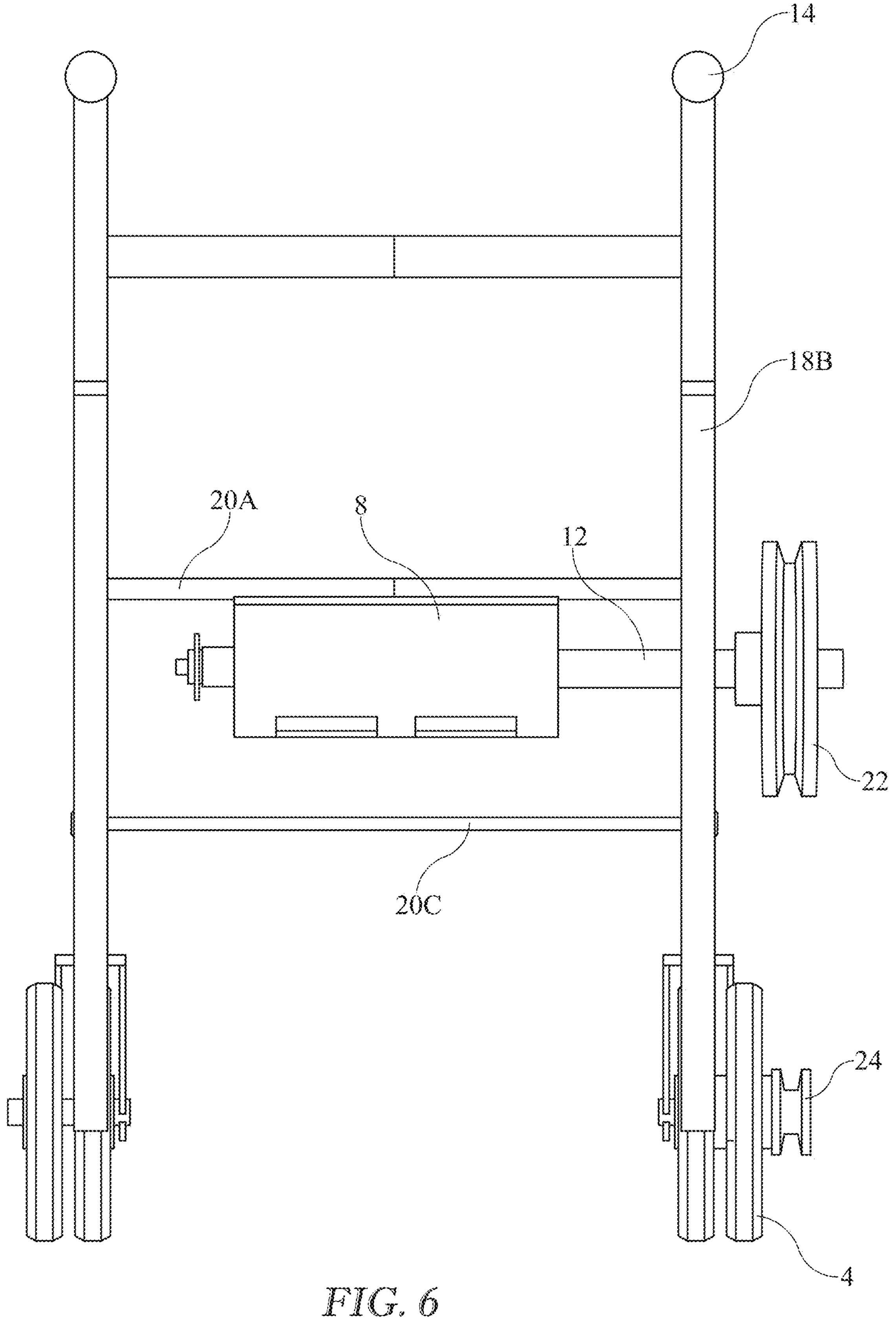
FIG. 6 is a rear view of a rollator with a projector.

FIG. 3 depicts rollator 2 from a right-side perspective. In various implementations, projections emitted from a projector attached to rollator 2 may be based on sensing of movement of one or more wheels 4. Using FIG. 3 as an example, wheel pulley 24 may be secured to a wheel 4. Rotation of wheel 4 that wheel pulley 24 is attached to may result in displacement of belt 26, and displacement of belt 26 may result in rotation of pulley drum 22. In various implementations, belt 26 may be replaced with a chain linkage and wheel pulley 24 and pulley drum 22 may include teeth capable of interfacing with the chain linkage.

In various implementations, pulley drum 22, wheel pulley 24, and belt 26 may not be present, and functions thereof may be replaced by one or more sensors and motors. For example, one or more sensors may be connected with one or more wheels 4 and produce an input signal indicative of rotational movement of the one or more connected wheels 4. A motor may receive the input signal indicative of the rotational movement of the one or more connected wheels, and rotate shaft 12 based on the input signal. In various implementations, shaft 12 may also not be present, as a motor replacing the function of pulley drum 22 (e.g., application of force onto shaft 12) may be positioned adjacent to and/or within projector housing 8, and may be configured to directly abut and/or engage the projector. It is appreciated that circuitry may connect various electronic and mechanical components in various implementations.

In various implementations, duplicates of components, such as pulley drums 22, wheel pulleys 24, and/or belts 26, and functional equivalents thereof, may be implemented. For example, when rollator 2 is sharply turning, e.g., in a ninety-degree configuration around a corner, one or more wheels may not be rotating. If a wheel pulley 24 is connected to the wheel that is not moving, then a projector may not reposition projections in accordance with the displacement of rollator 2. However, if duplicate components are implemented, e.g., another pulley drum, wheel pulley, belt, and/or shaft, and connected to a different, moving wheel, then a projector may reposition one or more projections responsive to movement of the different wheel, even though another wheel might not be moving. In such implementations, different projections projected by a projector may be based on separate wheels, such that a right-side projection may be based on movement of a wheel on the right-side, and a left-side projection may be based on movement of a wheel on the left-side. Duplication of components are not limited to examples discussed above. For example, in various implementations, multiple sensors, motors, and projectors may be implemented, wherein each side of a rollator has a respective duplicate component relative to another side.

Figure 7:
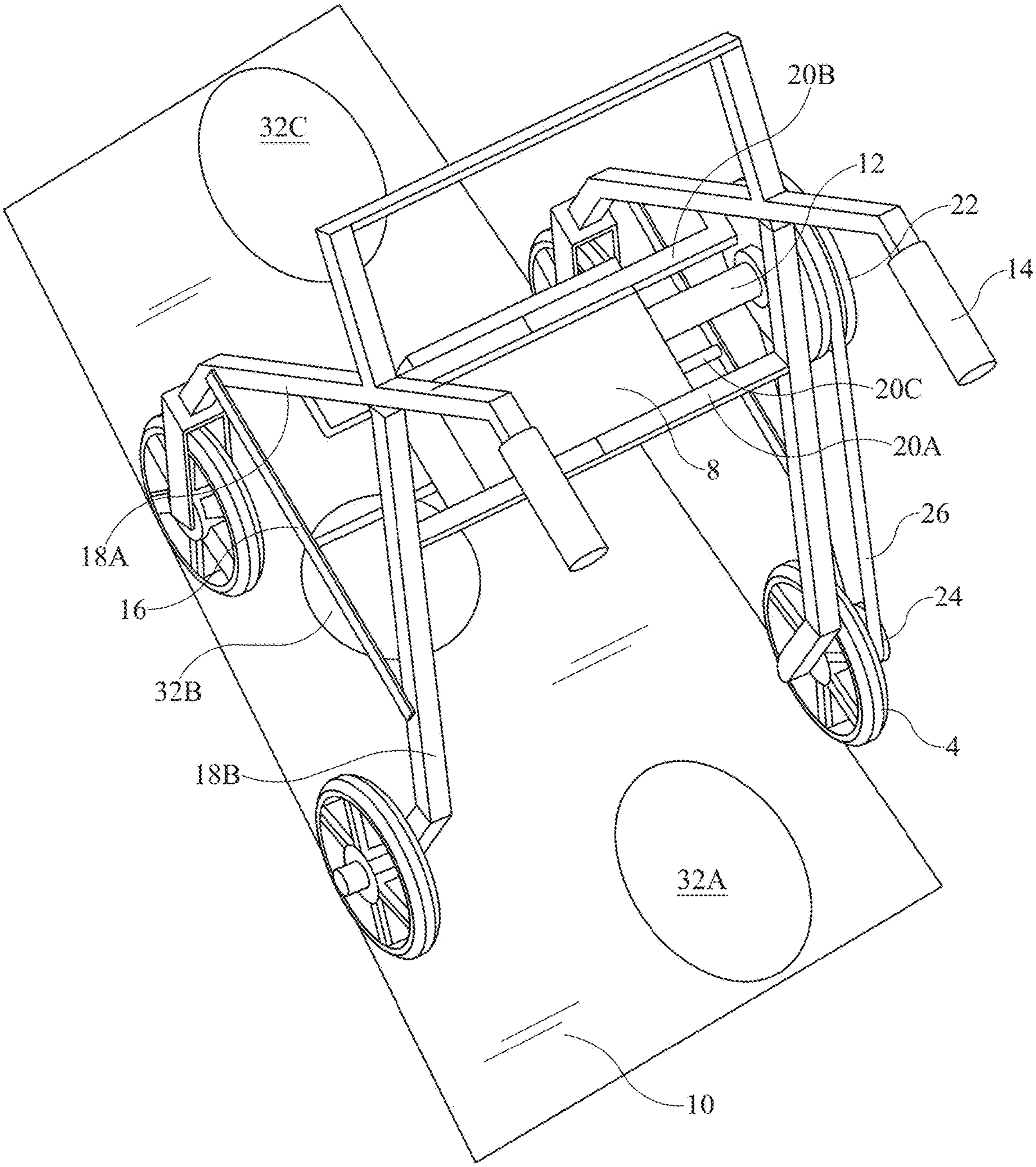
FIG. 7 is a rear downward view of a rollator with a projector projecting a first, second, and third projection.

FIG. 7 depicts rollator 2 from a rear downward perspective. Projections 32A-32C may be emitted by a projector onto the plane 10. Projections 32A-32C may be shaped like a circle or an oval and may be projected onto the plane 10 beneath the rollator 2. Further, multiple projections may be simultaneously emitted onto the plane 10. For example, FIG. 7 depicts three projections, 32A, 32B, and 32C being emitted onto the plane 10 simultaneously. Projections may be staggered and/or offset to indicate ideal foot placement for each foot at a point in time. E.g., projections may be staggered in that they appear at different overlapping and/or non-overlapping positions on a surface, and projections may be offset in that one or more projections may or may not appear along a same axis going through one or more other projections (e.g., an axis parallel with orientation of wheels 4 and/or handles 14). For example, 32A may indicate where to place a right foot at a first time, 32B may indicate where to place a left foot subsequent to placement of the right foot, and 32C may indicate where to reposition the right foot subsequent to placement of the left foot on 32B. Some projections may be adjacent to a first side of a rollator, while others may be adjacent to an opposite side of a rollator. For example, projection 32B may be adjacent to abscissa segment 16 and ordinate segments 18A and 18B, while projection 32A and 32C may be adjacent to an opposite side of rollator 2 having an opposing abscissa segment and ordinate segments. Put another way, projections 32A and 32C may appear along a first axis parallel with wheel 4 orientation (and/or handle 14 orientation), and projection 32B may appear along a second axis parallel with wheel 4 orientation (and/or handle 14 orientation).

As discussed previously, projections 32A-32C may be relatively static at a position of a surface beneath the rollator while the rollator is displaced. For example, even when a rollator is displaced (e.g., moved forward), one or more of projections 32A-32C may remain at a relatively static position. For example, one or more of projections 32A-32C may appear at a substantially static location and/or remain in a substantially static orientation while a rollator is displaced, resulting in a variable distance between a rollator and a projection 32A-32C based on rollator displacement. Locations and orientations of one or more projections 32A-32C may appear to be more static during instances in which the rollator is being displaced substantially forwards or backwards (e.g., in-line with wheel and/or handle orientation), and may appear to be less static if the rollator is displaced via rotation (e.g., rotated about a point, resulting in projections being adjusted based on the angle of rotation). This may aid a user in determining future, current, and previous ideal foot placements. Greater displacement may result in one or more of projections 32A-32C ceasing to be projected onto the surface. Additionally, greater displacement may result in additional projections continually being projected onto the surface (and after further displacement, projections may cease to be projected). Consequently, displacement of a rollator may result in a continual cycle of new and previous projections being simultaneously projected onto a surface, such that a first projection may match a current ideal foot placement on one side of a rollator, a second projection may match a subsequent ideal foot placement on an opposite side of the rollator, a third projection may match a still yet subsequent ideal foot placement on the same side as the first projection, and so on, to indicate ideal feet placement corresponding to a traditional walking gait. One or more projections may cease to be projected based on a given quantity of projections meeting a threshold value, based on temporal considerations, based on displacement off the rollator, etc.

The placements and orientations of projections may also ease the way a user can initiate an ideal walking gait, as a plurality of projections may be projected onto a surface beneath the rollator without requiring an initial displacement of the rollator. For example, a rollator may project projections 32A-32C while remaining static, allowing a user to line up a plurality of ideal foot placements prior to displacement of the rollator and allowing a user to ensure that previous ideal foot placements are maintained and/or adjusted accurately subsequent to displacement of a rollator.

Accordingly, emission of projections 32A-32C may be coordinated to indicate ideal foot placements for each foot while a user is walking. This provides a benefit relative to walking aids with a single projection, as a user is less likely to be confused as to which foot to move, how far to move it, or where to place it relative to the other foot. Projections appearing on different sides of a rollator that are alternately staggered relative to projections of an opposing side may provide clearer identification for individual foot placement relative to a single projection, which may leave greater ambiguity as to ideal foot placement. Available parameters, including shapes, dimensions, and patterns of projections 32A-32C provide further benefits over singular projection emissions. While a singular straight line projection spanning from one side of a rollator to another may leave a user confused as to where exactly to place a foot relative to the singular projection (e.g., in front of the line, on top of the line, behind the line, etc.) projections having a shape and size corresponding to a human foot, as disclosed herein, make identification of ideal foot placement (e.g., within the projection) for each foot more convenient.

In various implementations, projections 32A-32C may be colored or patterned in distinct ways. For example, projections appearing on a right side, e.g., 32A and 32C, may be colored red, while projections appearing on a left side, e.g., 32B may be colored green. Similarly, projections on one side may be solid, while projections on the opposing side are only outlines. Accordingly, projections need not share identical parameters, and projections 32A and 32C on the right side may be associated with one or more parameters that differ from parameters associated with projections 32B on the left side. These examples are non-limiting, and projections may correspond with other parameters, e.g., shapes, sizes, colors, patterns, intensities, brightnesses, placements etc., to further distinguish respective locations for placement of each foot of a user. For example, an LED may be shaped, spaced, and/or oriented such that the LED projects light in a desired shape or size. As another example, structures may be used to block and/or shade light emitted from an LED, such that unblocked light and/or shaded light projected onto a surface depicts a shape and/or size. Further, lenses may be used to shape, shade, color, etc., light projected from the LED.

Figure 8:
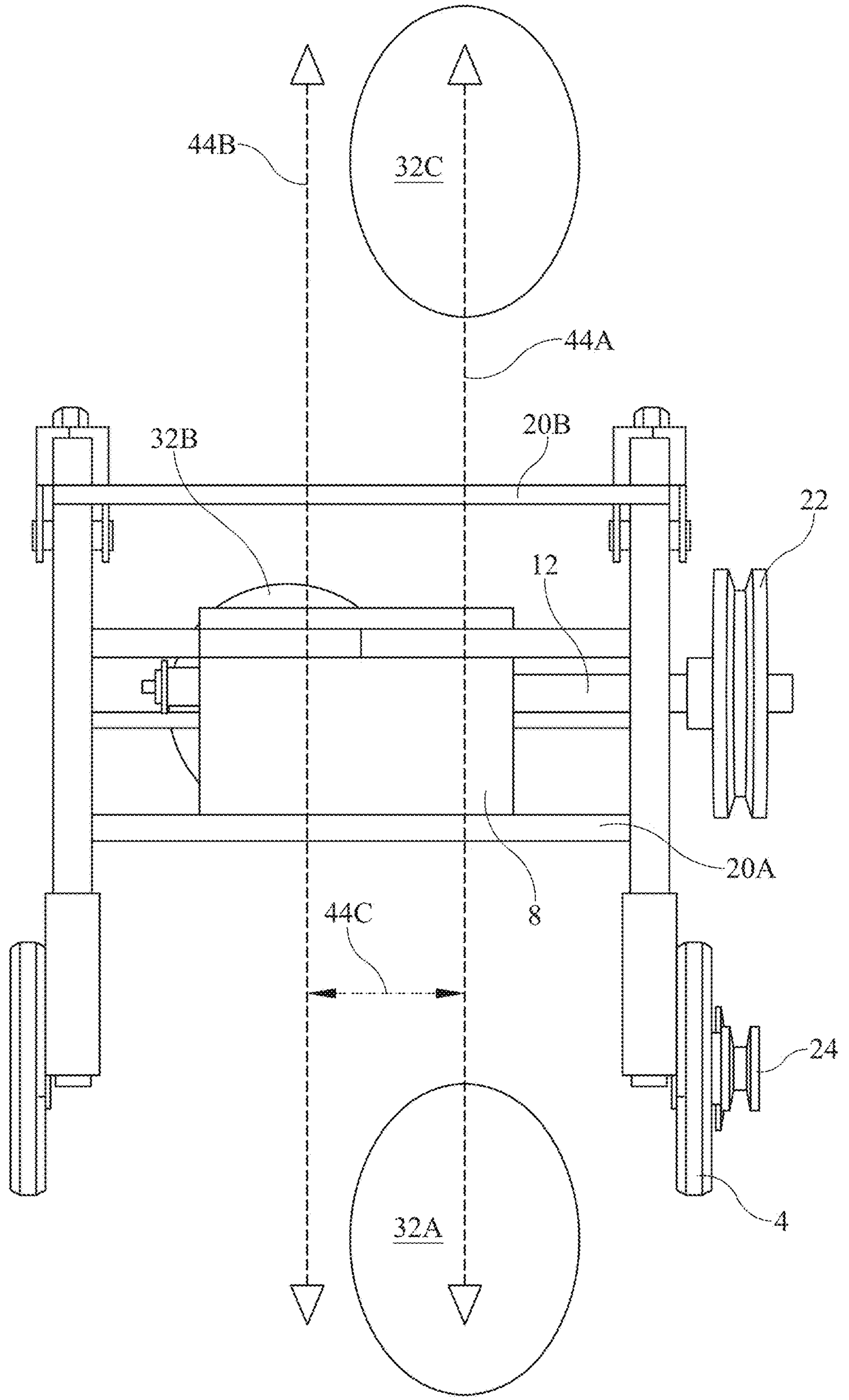
FIG. 8 is a downward view of a rollator with a projector projecting a first, second, and third projection.

FIG. 8 depicts a top-down view of rollator 2 and projections 32A-32C. The axial symmetry exhibited by projections 32A and 32C as compared to projection 32B can be seen more clearly from this top-down view. Dashed lines 44A and 44B have been added to further illustrate these axial symmetries. For example, an axis represented by line 44A passes longitudinally through each center of projection 32A and 32C. If, for example, projection 32A or 32C were bifurcated along line 44A, two halves would result, creating a mirror like reflection with respect to each side of line 44A. By contrast, an axial symmetry does not exist between all three of 32A, 32B, and 32C, because 32B is offset relative to line 44A. FIG. 8's illustration depicting these axial symmetries, staggard positions, and offset positions, example how projections may be projected on a surface beneath a rollator to indicate and aid the user in achieving a walking pattern (e.g., foot placement) corresponding to a traditional gait. For example, FIG. 8 depicts projection 32A as being at least partially behind the rollator, projection 32B as being beneath the rollator, and 32C as being in front of the rollator, indicating a respective right-foot step indication (e.g., projection 32A), a subsequent left-foot step indication (e.g., projection 32B), and a second right-foot step indication (e.g., projection 32C).

As discussed previously, parameters of projections 32A-32C (e.g., offset spacings, staggered spacings, shapes, colors, etc.) may be adjusted herein. In various implementations, parameters may be adjusted by modifying components discussed herein, selecting parameters using a switch, and/or selecting parameters using a remote device (e.g., cell phone, remote controller), etc. In various implementations, an application executing on device may be used to configure parameters associated with projections 32A-32C.

For example, a distance between projections 32A-32C may be modified, such that patients desiring longer step patterns may select a corresponding longer distance parameter, and patients desiring shorter step patterns may select a corresponding shorter distance parameter. For example, distances of 39 cm, 52 cm, and 78 cm may be provided as selectable parameters. The width between lines 44A and 44B may also be adjusted. For example, patients desiring a greater width between placement of feet may select a first width parameter, and patients desiring a narrow width between placement of feet may select a second width parameter.

Put another way, using FIG. 8 as an example, a lengthwise distance between projections 32A and 32C along line 44A may be modified, such that a distance between each footstep by a given same leg of a user may be modified. E.g., projections 32A and 32C may be staggered further apart or closer together. As another example, a widthwise distance between lines 44A (which projection 32A and 32C occur on) and 44B (which projection 32B occurs on) may also be modified, such that projections for separate feet (e.g., left foot and right foot) may be spaced more broadly apart or narrowly together. E.g., projections 32A and 32B may be offset more broadly apart or narrowly together. Adjustments of parameters (e.g., staggered and/or offset parameters) may result in projections being brought into or out of at least partially overlapping positions. E.g., projections may or may not overlap based on adjustment of parameters.

Parameters discussed herein (e.g., including offset and/or staggered parameters) may be modified based on hardware configurations (e.g., LED placement, spacing, orientation, etc., on a projector), and/or software configurations (e.g., a controller exchanging I/O signals that result in modification of one or more parameters, etc.). Various switches, processors, computers, etc., may be used to implement selection and/or modification of one or more parameters. In various implementations, one or more parameters discussed herein may be selected and/or modified by a user. For example, a user may select and/or modify one or more parameters by adjusting one or more switches, one or more hardware configurations, and/or one or more software configurations, etc. Put another way, one or more parameters may be modified and/or selected based on user input, e.g., user input provided to one or more switches and/or computers.

Figure 9:
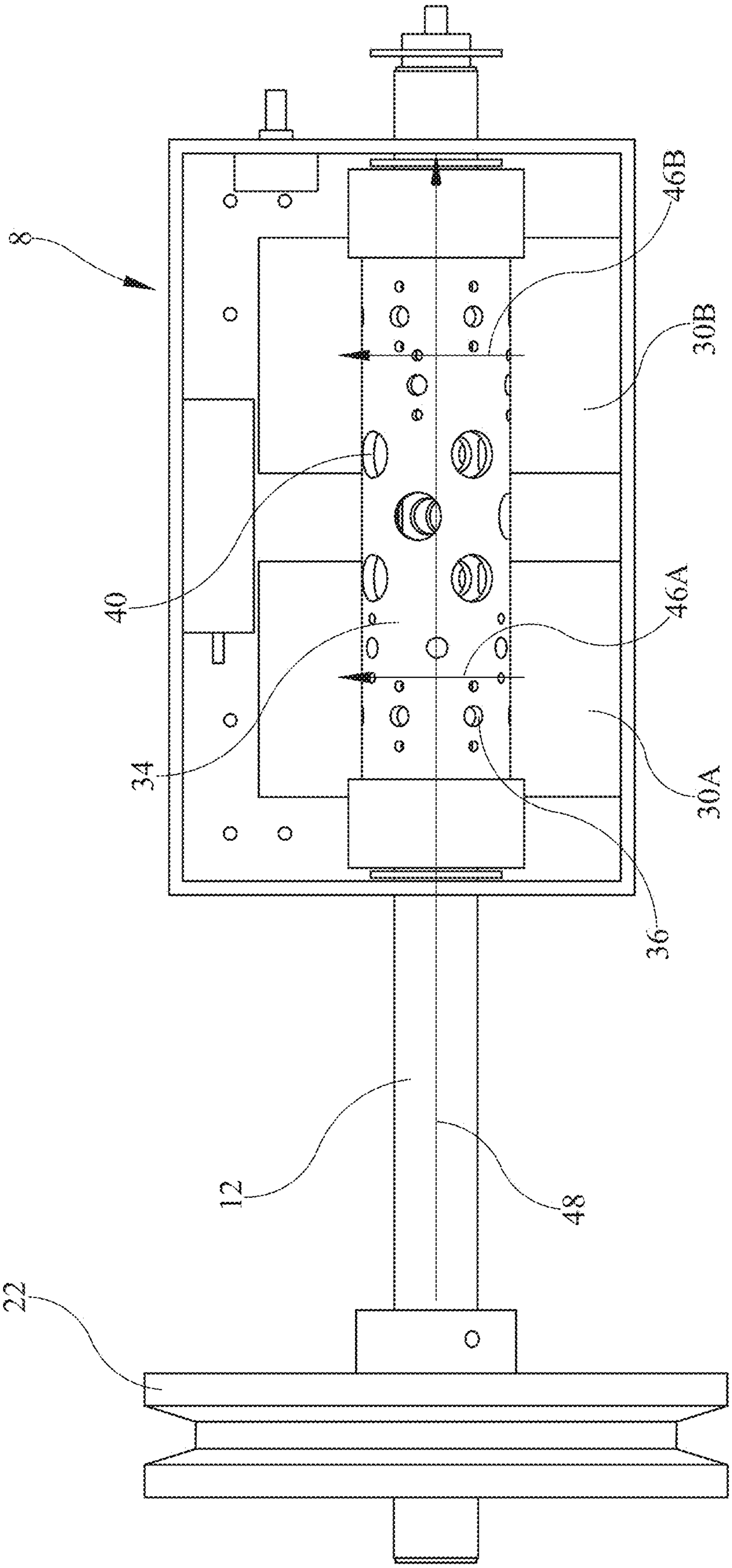
FIG. 9 is a downward cutaway view of a pulley, projector housing, projector housing apertures, projector, and LED banks.

FIG. 9 depicts a top-down cut-away view of projector housing 8. Pulley drum 22 is depicted on the left side of FIG. 9. Shaft 12 connects pulley drum 22 and projector 34. Projector 34 may include one or more projector LEDs and projector apertures. Projector housing 8 surrounds projector 34, and includes projector housing apertures 30A and 30B.

Projector 34 may have a cylindrical shape, a longitudinal axis parallel with shaft 12, a lateral axis perpendicular to shaft 12, and a radial axis along a surface of projector 34. Projector 34 may be divided into one or more circumferential portions. In various implementations, the circumferential portions may align with housing apertures 30A and 30B. In various implementations, LEDs 36 may be divided into banks associated with particular circumferential portions, such as a first bank of LEDs corresponding to a first circumferential portion and a second bank of LEDs corresponding to a second circumferential portion. In various implementations, one or more circumferential axes 46A and 46B may run along the circumference of the light projector and pass through a longitudinal axis 48 that is parallel with the shaft 12. LEDs may be staggered along the circumferential axes. In various implementations, projections of the light projector 34 may be projected along a first and second axis of a plane beneath a rollator, wherein the first and second axes are separated by a width proportional to spacing between circumferential axes. In various implementations, the first and second axes of the plane beneath a roller correspond to lines 44A and 44B. In various implementations, a widthwise axis 44C perpendicular to first and second axes, of the plane beneath the rollator, may pass through only a single projection along the first axis or only a projection along the second axis at a time.

Projector LEDs 36 may be staggered and/or offset along the surface of projector 34. For example, LEDs 36 may be staggered in different overlapping or non-overlapping positions on the surface of projector 34. As discussed previously, LEDs may be staggered in different positions on circumferential portions of the projector 34. LEDs 36 may be offset such that a longitudinal axis parallel to shaft 12 would pass through LEDs 36 of only one circumferential portion, but not another. LEDs 36 being offset and/or staggered can cause projections emitted from the LED 36 to be spaced offset and staggered apart on the plane 10 beneath the rollator 2, e.g., corresponding to a traditional gait pattern of positioning one foot at a time in an alternating sequence.

Projector 34 may also have one or more projector apertures 40. Apertures 40 may provide many functionalities, such as heat dissipation and room for circuitry to run through. Projector LEDs 36 may generate heat, and the projector apertures 40 may enable that heat to dissipate. Further, circuitry may be run beneath the surface of projector 34 and/or through apertures 40, enabling projector LEDs 36 to receive power. Many different configurations of circuitry can be implemented to achieve the functions disclosed herein. Due to the rotational nature of components discussed herein, circuitry may conduct electricity through brushes configured to conduct electricity regardless of rotation.

Figure 10:
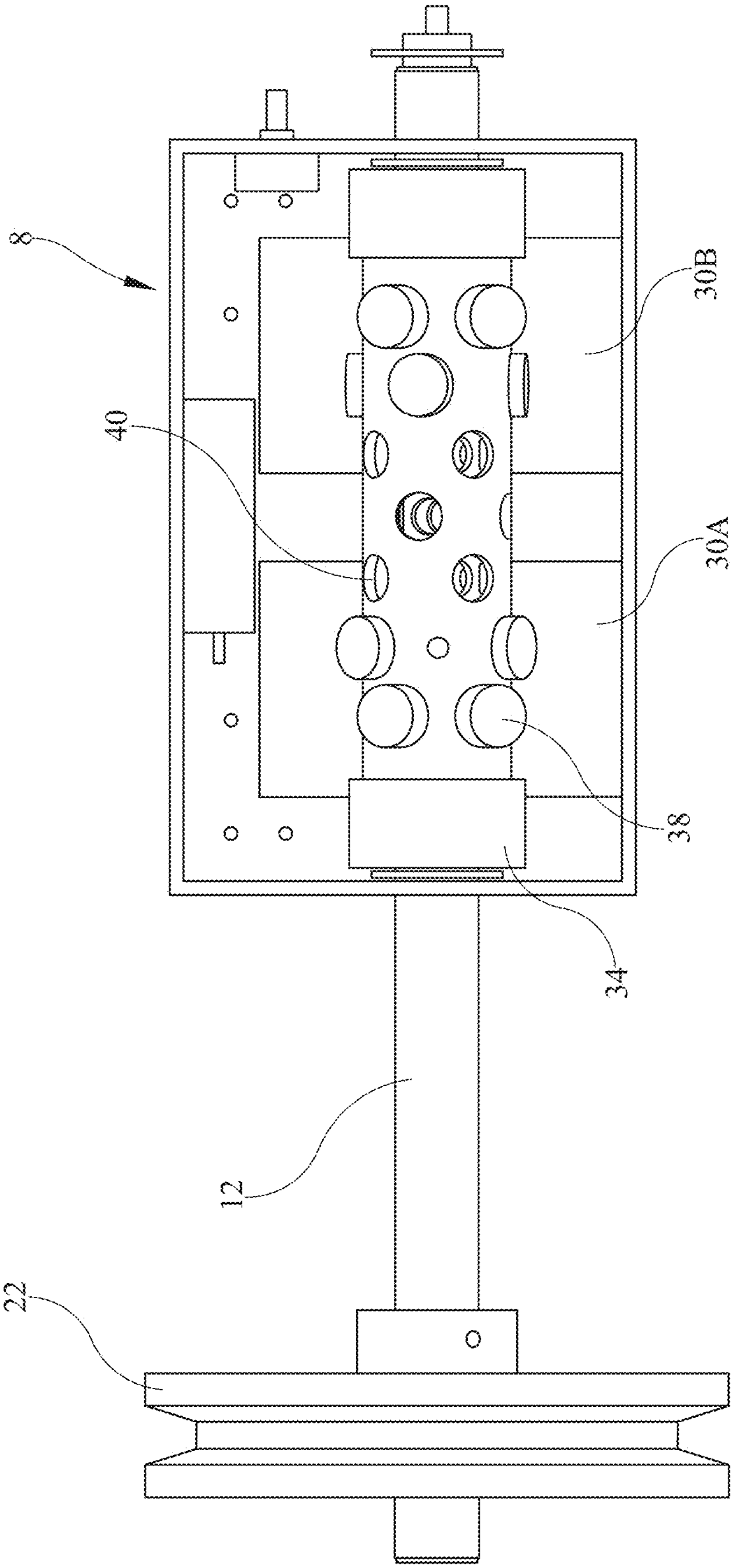
FIG. 10 is a downward partially cross-sectional view of a pulley, projector housing, projector housing apertures, projector, and LED banks with lenses over LEDs of the banks.

FIG. 10 depicts a top-down cut-away depiction of projector housing 8, that is similar to FIG. 9 but includes projector lenses 38. Projector lenses 38 are positioned where each LED of FIG. 9 would be. Projector lenses 38 may be located adjacent to LEDs so that light emitted by LEDs may be shaped, contoured, focalized, diffused, colored, etc. Accordingly, projector lenses 38 may be focalized, in that they focus and/or enhance focus of light emitted by an LED. Focalized lenses may be of a variety of dimensions, and thus have varying lens diameters, focal lengths, imaging points, fields of view, etc. For example, focal lengths may be 25 mm, 50 mm, 100 mm, etc. In various implementations, projections emitted by an LED may be enhanced by passing through the projector lenses 38. In various implementations, a projector lens may be secured to one or more LEDs. In various implementations an LED itself (e.g., without a projector lens 38) may be configured to emit light with one or more of the aforementioned parameters.

In various implementations, an LED may be configured to emit light through one or more of the projector housing apertures, e.g., 30A and/or 30B, to achieve one or more of the aforementioned parameters. For example, an LED without a projector lens 38 may be configured to emit light through a housing aperture 30A and/or 30B that is shaped and/or contoured to provide a desired effect. As a more direct example, an LED may be configured to emit light through a square shaped housing aperture, causing light projecting through the housing aperture 30A to be projected onto a plane beneath a rollator in the shape of a square. An LED configured to emit light though a different, circular shaped housing aperture, may cause light projecting through circular shaped housing aperture to be projected onto a plane beneath a rollator shaped like a circle. Similarly, LEDs and/or projector housing apertures may be dyed, patterned, etc., to create additional desirable projection effects without need for a projector lens 38. In various implementations, circuitry may be implemented to cause LEDs to only activate when a projector 34 is in a certain orientation (e.g., LEDs may only emit light when they are currently facing a surface beneath a rollator, and may not emit light when they are not currently facing a surface beneath a rollator). Various orientational sensors and/or encoders may be implemented to identify orientation of a projector housing. In various implementations, projector lenses may be more customizable, e.g., they can be swapped out and/or modified to adjust projection parameters. In various implementations, a combination of circuitry, LEDs, projector lenses and projector housings may be utilized to create a desired effect.

Figure 11:
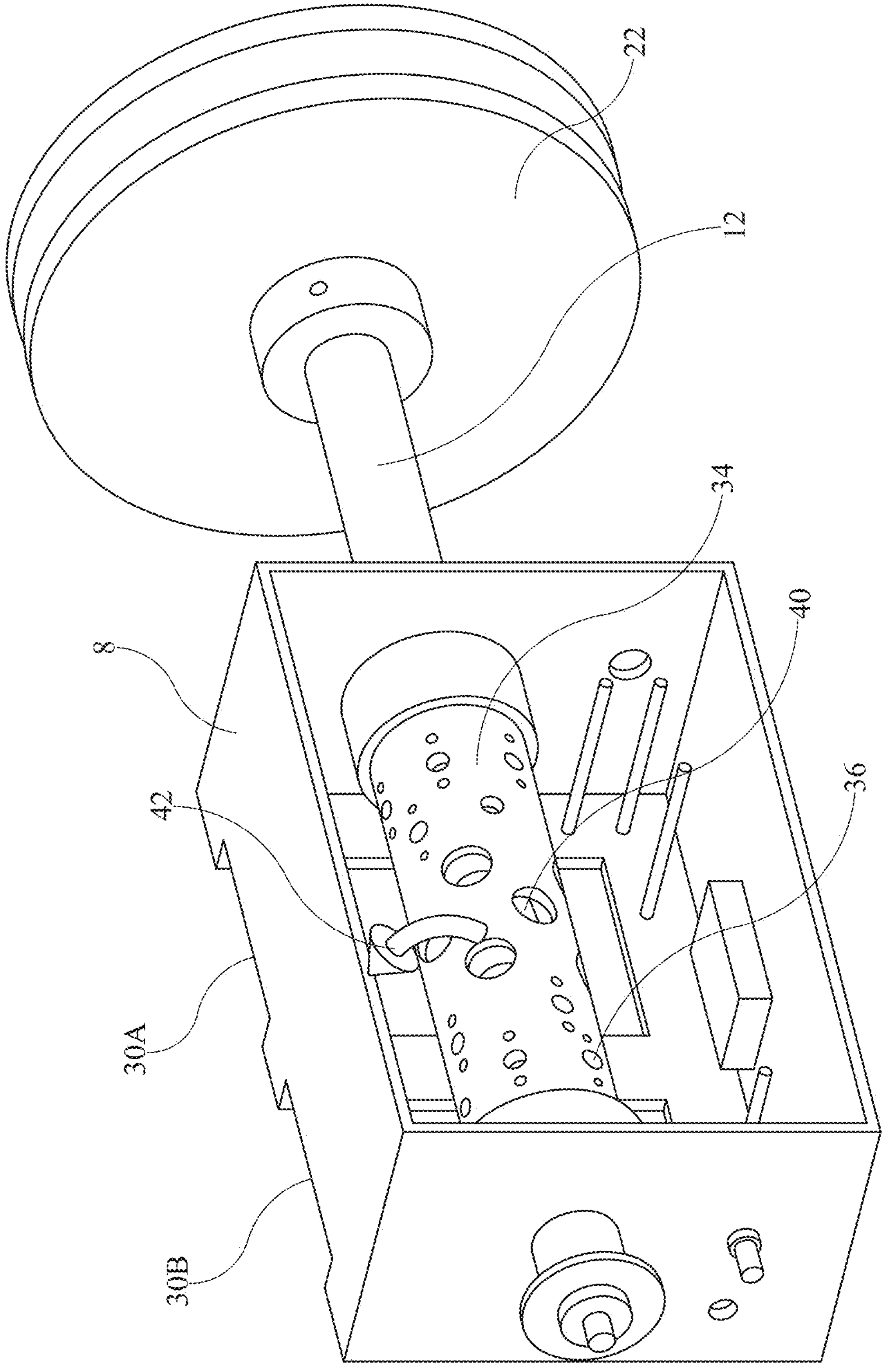
FIG. 11 is a perspective partially cross-sectional view of a pulley, projector housing, projector housing apertures, projector, LED banks, and indicator of possible rotational movement of the projector.

FIG. 11 depicts a top side perspective cutaway view of projector housing 8. An arrow 42 indicates a direction in which projector 34 may rotate in this example. Accordingly, in various implementations the projector 34 may be a rotating projector 34. Further, housing apertures 30A and 30B are depicted as having portions on both a bottom surface of the projector housing 8 and a front surface of projector housing 8. Housing apertures 30A and 30B are not limited to one or more surfaces and may extend to a plurality of surface sides of projector housing 8. For example, apertures 30A and 30B may extend across a front surface, a bottom surface, and a rear surface of projector housing 8.

Locations of apertures 30A and 30B may impact how projections are projected unto a plane beneath a rollator. For example, a projector housing confining apertures 30A and 30B to a bottom surface of projector housing 8 will have a smaller range in which projections can appear on a surface beneath a rollator, due to projector housing 8 surfaces preventing projections from reaching the surface (e.g., by blocking, obscuring, and/or filtering light). Alternatively, a projector housing confining apertures 30A and 30B to a front surface and a bottom surface will have a larger range, in which projections may appear further in front of a rollator, due to projections not being blocked by a front surface of a projector housing 8. Still yet, a projector housing confining apertures 30A and 30B to a front surface, a bottom surface, and a rear surface will have a still yet larger range, in which projections may appear in front of, beneath, and behind a rollator. Accordingly, ranges in which projections may appear on a surface beneath a rollator may be impacted by placement of projector housing apertures.

Figure 12:
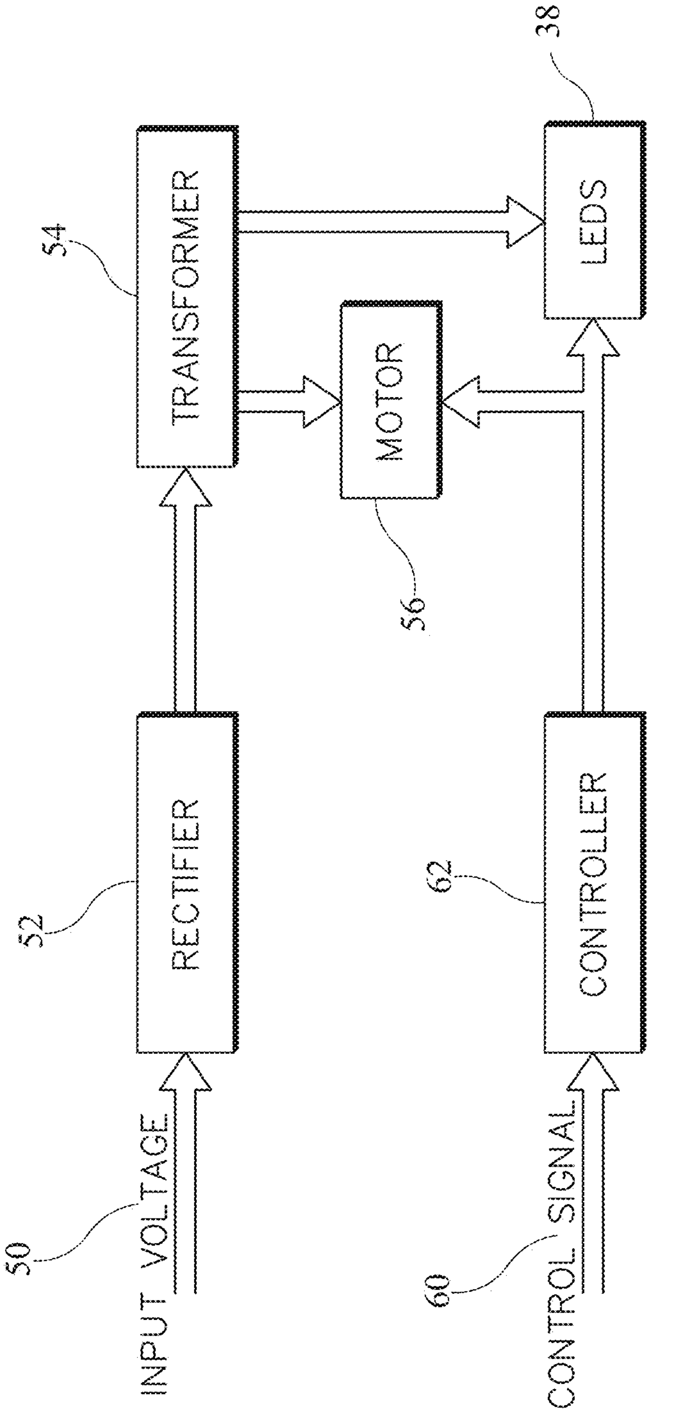
FIG. 12 is a block diagram depicting flow of power and controls to components discussed herein.

FIG. 12 depicts a flow diagram for powering and controlling features disclosed herein. Input voltage 50 is provided from a power source. The power source that input voltage is provided from may be a line voltage of 120 VAC. In various implementations, the power source that input voltage is provided by a battery providing direct current (DC) voltage. Input voltage 50 may be provided to a rectifier 52, which may convert alternating current (AC) input voltage 50 to a DC voltage.

Transformer 54 may transform voltage subsequent to rectification. The transformed voltage may correspond with, e.g., ideal voltages for a motor 56 for moving components discussed herein and LEDs 38. For example, the transformer 54 may provide a transformed voltage to motor 56, which may be configured to rotate a projector mounted to a rollator, e.g., in response to sensor input indicating rotation of one or more rollator wheels. In various implementations, transformer 54 may provide a plurality of transformed voltages corresponding to different components. For example, transformer 54 may provide a first transformed voltage to motor 56 and a second transformed voltage to LEDs 38, as motor 56 and LEDs 38 may need to be driven at different voltages.

A control signal 60 may be provided to controller 62. Control signal 60 may be provided by one or more components discussed herein. For example, control signal 60 may correspond with one or more sensors, e.g., configured to identify rotation of one or more wheels. As another example, control signal 60 may correspond with one or more switches, e.g., controlled by a user to adjust one or more parameters discussed herein (e.g., projection distances, shapes, colors, etc.). Control signal 60 may be provided by one or more remote devices.

Controller 62 may receive control signal 60 and provide an output signal to one or more of motor 56 and/or LEDs 38. Using output signals, controller 62 may control motor 56 and LEDs 38. For example, controller 62 may control direction and speed at which motor 56 is driven. As another example, controller 62 may control shape and intensity at which LEDs 38 are driven. It is appreciated that controller 62 may adjust other parameters discussed herein corresponding to motor 56 and LEDs 38.

Figure 13:
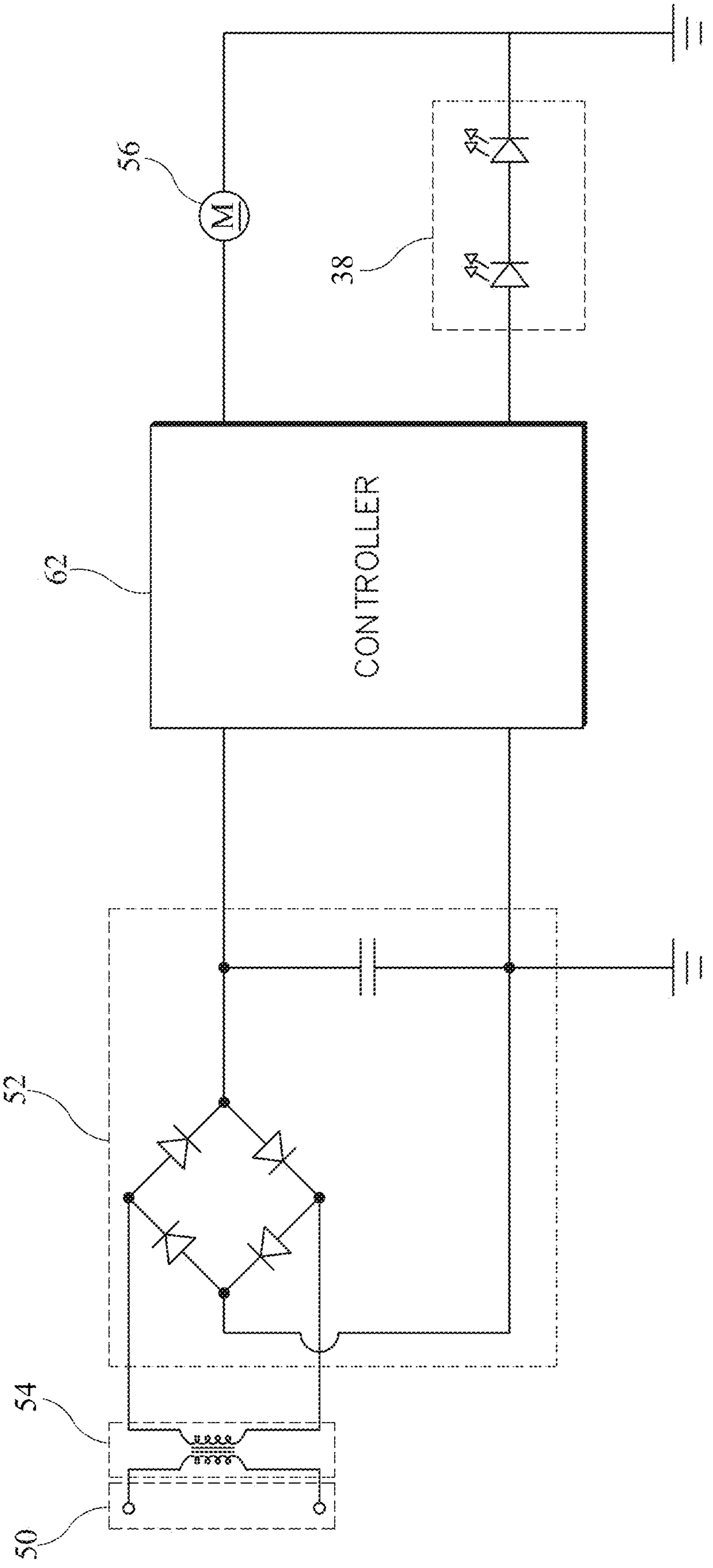
FIG. 13 is a schematic depicting circuitry for powering and operating components discussed herein.

FIG. 13 schematically depicts examples of circuitry configured to power and control features discussed herein. Input voltage 50 may correspond to AC and/or DC voltage as discussed above. Input voltage 50 may be provided to transformer 54, which may convert input voltage 50 to a transformed voltage, e.g., which may be more suitable to drive components discussed herein. A rectifier 52 may convert AC voltage to DC voltage, which may be suitable to drive components discussed herein. Rectifier 52 is depicted as a full-wave rectifier with a bridge rectifier diode. Rectified and transformed electricity may be provided to controller 62, which may comprise one or more of sub-circuitry, an integrated logic chip, and a processor. Controller 62 may provide output to drive motor 56 and LEDs 38. Additional technology and equipment, such as one or more LED drivers, batteries, chargers, etc., may be implemented.

Figure 14:
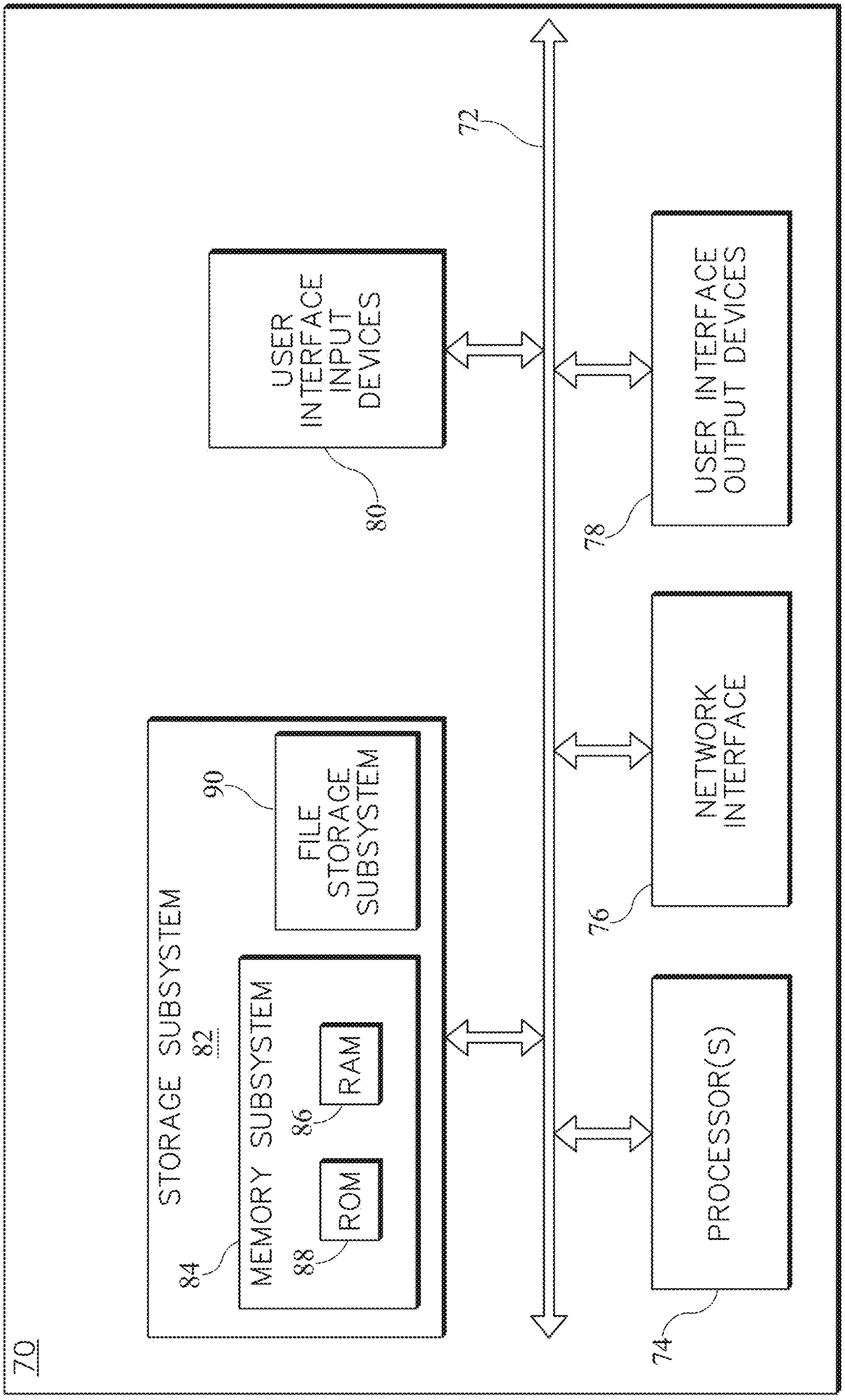
FIG. 14 is a block diagram of an example computing device that may optionally be utilized to perform one or more aspects of techniques described herein.

FIG. 14 is a block diagram of an example computing device 70 that may optionally be utilized to perform one or more aspects of techniques described herein. Computing device 70 typically includes at least one processor 74 which communicates with a number of peripheral devices via bus subsystem 72. These peripheral devices may include a storage subsystem 82, including, for example, a memory subsystem 84 and a file storage subsystem 90, user interface output devices 78, user interface input devices 80, and a network interface subsystem 76. The input and output devices allow user interaction with computing device 70. Network interface subsystem 76 provides an interface to outside networks and is coupled to corresponding interface devices in other computing devices.

User interface input devices 80 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 70 or onto a communication network.

User interface output devices 78 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 70 to the user or to another machine or computing device.

Storage subsystem 82 stores programming and data constructs that provide the functionality of some or all of the modules described herein. For example, the storage subsystem 82 may include the logic to perform selected aspects disclosed herein.

These software modules are generally executed by processor 74 alone or in combination with other processors. Memory 84 used in the storage subsystem 82 can include a number of memories including a main random-access memory (RAM) 86 for storage of instructions and data during program execution and a read only memory (ROM) 88 in which fixed instructions are stored. A file storage subsystem 90 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 90 in the storage subsystem 82, or in other machines accessible by the processor(s) 74.

Bus subsystem 72 provides a mechanism for letting the various components and subsystems of computing device 70 communicate with each other as intended. Although bus subsystem 72 is shown schematically as a single bus, alternative implementations of the bus subsystem may use multiple busses.

Computing device 70 can be of varying types including a workstation, server, computing cluster, blade server, server farm, or any other data processing system or computing device. Due to the ever-changing nature of computers and networks, the description of computing device 70 depicted in FIG. 14 is intended only as a specific example for purposes of illustrating various implementations. Many other configurations of computing device 70 are possible having more or fewer components than the computing device depicted in FIG. 14.

Examples disclosed herein are merely demonstrative of the numerous applications and variations that can be achieved.

I claim:

1. A rollator including:

a frame having a plurality of wheels;

a light projector housing mounted to the frame, wherein the light projector housing includes one or more housing apertures facing at least a plane over which the plurality of wheels are in contact;

a light projector located inside the light projector housing, wherein the light projector rotates proportional to at least one wheel of the plurality of wheels;

a first bank of LEDs spaced along a first circumferential portion of the light projector and a second bank of LEDs spaced along a second circumferential portion of the light projector, wherein LEDs of the first bank of LEDs and the second bank of LEDs are staggered and offset; and a power supply electrically connected to the first bank of LEDs and to the second bank of LEDs.

2. The rollator of claim 1, wherein the first bank of LEDs and the second bank of LEDs are electrically connected to at least one driver, and wherein the first bank of LEDs and the second bank of LEDs are of different colors.

3. The rollator of claim 1, wherein the first bank of LEDs project light projections adjacent to a first side of the rollator frame, and wherein the second bank of LEDs project light projections adjacent to a second side of the rollator frame that is opposite the first side of the rollator frame.

4. The rollator of claim 3, wherein the light projections of the first bank of LEDs and the second bank of LEDs are circular or oval shaped.

5. The rollator of claim 3, wherein one or more lenses are secured adjacent to each LED of the first bank of LEDs and the second bank of LEDs, and wherein the light projections of the first bank of LEDs and the second bank of LEDs are circular or oval shaped based on the light projections of the first bank of LEDs and the second bank of LEDs passing through the one or more lenses.

6. The rollator of claim 3, wherein the light projections of the first bank of LEDs are projected along a first axis that is parallel to an orientation of the plurality of wheels and the light projections of the second bank of LEDs are projected along a second axis that is parallel with the orientation of the plurality of wheels.

7. The rollator of claim 3, wherein the light projections adjacent to the first side of the rollator frame are staggered apart by a distance that is selectable by a user.

8. The rollator of claim 3, wherein the light projections adjacent to the first side of the rollator frame and the light projections adjacent to the second side of the rollator frame are offset by a distance that is selectable by a user.

9. The rollator of claim 1, wherein the at least one or more housing apertures of the light projector housing face at least a plane over which the plurality of wheels are in contact.

10. The rollator of claim 1, wherein each of the LEDs of the first bank of LEDs and of the second bank of LEDs have a focalized lens.

11. The rollator of claim 10, wherein the focalized lens for each of the LEDs causes light projections of the first bank of LEDs and the second bank of LEDs to be circular or oval shaped.

12. The rollator of claim 1, wherein rotation of the light projector is caused by a connection between the light projector and the at least one wheel, the connection being a mechanical belt and a pulley system, including a pulley drum attached to a shaft that is attached to the light projector, a pulley that is attached to the at least one wheel, and a belt connecting the pulley drum and the pulley.

13. The rollator of claim 1, wherein rotation of the light projector is caused by a connection between the light projector and the at least one wheel, the connection being an electronic connection including one or more sensors configured to identify displacement of the at least one wheel and configured to send a signal to a motor connected to the light projector, wherein the signal causes the motor to rotate the light projector proportional to the displacement of the at least one wheel.

14. The rollator of claim 1, wherein the first and second bank of LEDs project light projections are maintained at fixed positions on a surface beneath the rollator while the rollator is displaced over the surface.

15. A rollator, comprising:

a frame having a plurality of wheels;

a light projector housing, mounted to the frame, that houses a rotating light projector;

the light projector having a first bank of LEDs including a first plurality of staggered LEDs, and a second bank of LEDs including a second plurality of staggered LEDs, wherein the first bank of LEDs and the second bank of LEDs are offset and positioned on separate circumferential portions of the light projector, and wherein the first bank of LEDs project light adjacent to a first side of the frame and the second bank of LEDs project light adjacent to a second side of the frame; and wherein the rotating light projector rotates proportionally to rotation of at least one wheel of the plurality of wheels.

16. The rollator of claim 15, wherein the first bank of LEDs and the second bank of LEDs project light projections that are circular or oval shaped, and that are projected onto a surface beneath the plurality of wheels.

17. The rollator of claim 16, wherein a focalized lens is secured over each of the LEDs.

18. The rollator of claim 16, wherein the first bank of LEDs is a first color and the second bank of LEDs is a second color.

19. The rollator of claim 16, wherein the light projections are maintained at fixed positions on the surface while the rollator is displaced over the surface.

20. A rollator comprising:

a frame having a plurality of wheels;

a light projector housing mounted to the frame, wherein the light projector housing includes one or more housing apertures facing at least a plane over which the plurality of wheels are in contact;

a light projector located inside the light projector housing, wherein the light projector rotates proportionally to a wheel of the plurality of wheels, a first bank of lights equidistantly spaced along a first circumferential axis of the light projector and a second bank of lights equidistantly spaced along a second circumferential axis of the light projector, wherein the first circumferential axis and the second circumferential axis are spaced apart and parallel, wherein a longitudinal light projector axis, that is perpendicular to, and passes through, the first circumferential axis and the second circumferential axis, passes through only one of a light of the first bank of lights or a light of the second bank lights based on a rotational position of the light projector, wherein the first bank of lights are configured to project one or more first projections along a first axis of the plane, and wherein the second bank of lights are configured to project one or more second projections onto a second axis the plane, the first axis and second axis of the plane being parallel and separated by a width that is proportional to spacing between the first and second circumferential axis, wherein a widthwise axis, that is perpendicular to, and passes through, the first axis of the plane and the second axis of the plane, passes through only one of a first projection of the one or more first projections or a second projection of the one or more second projections, based on the rotational position of the light projector, and wherein the first projection and the second projection are projected simultaneously.

* * * * *